Patented Dec. 1, 1942

2,303,329

UNITED STATES PATENT OFFICE 2,303,329

ZINC OXIDE

Howard M. Cyr, Palmerton, Pa., assignor to The New Jersey Zinc Company, New York, N. Y., a corporation of New Jersey No Drawing. Application July 6, 1940, Serial No. 344,233

7 Claims. (Cl. 106—296)

This invention relates to zinc oxide and is concerned particularly with the treatment of zinc oxide with propionic acid to improve its characteristics as a compounding agent with rubber.

As disclosed in the copending application of Bruce R. Silver and Ernest R. Bridgewater, Serial No. 344,237, filed July 6, 1940, zinc oxide that has been surface-treated with propionic acid so that zinc propionate is formed on the surfaces of the particles thereof is a superior rubber compounding agent. Such zinc oxide may be incorporated more readily in rubber and tends to disperse more thoroughly therein than does untreated zinc oxide. Moreover, such zinc oxide beneficially affects the curing and working characteristics of rubber compounds into which it is incorporated.

As a result of my investigations, I have developed an improved propionic acid-treated zinc oxide product and have discovered improvements in methods for conducting such treatment, to the end that the product is even more readily and thoroughly dispersed in rubber with consequent further improvement in the resulting rubber compound. Thus, I have discovered that zinc oxide of optimum characteristics (in so far as incorporation into rubber is concerned) is produced by treating it with from .1% to .6% of propionic acid on the weight of the zinc oxide under conditions such that zinc propionate is formed on the surface of the particles. The amount of propionic acid required to coat the zinc oxide particles is, of course, directly proportional to the total surface area of the particles; therefore, generally speaking, the finer the zinc oxide the more propionic acid is required. However, as indicated above, treatment with from .1% to .6% of propionic acid on the weight of the zinc oxide is adequate with any ordinary type of zinc oxide and results in a product in which most of the particles are surface-coated with zinc propionate.

In the case of ordinary American process zinc oxide with particles of an average particle size of 25 to .35 micron, optimum results are obtained employing from .3% to .5% of propionic acid. In the case of a specific American process zinc oxide with particle diameters averaging .28 to .35 micron, treatment with .4% propionic acid on the weight of the zinc oxide has been found to be optimum.

In general, treatment of zinc oxide with less than .1% propionic acid produces only a relatively minor improvement of dispersion in rubber. Dispersion generally reaches an optimum when .4% to .6% propionic acid is employed and above .6% there is ordinarily a lowering in dispersing effect.

The propionic acid employed preferably is of high purity, say, 98% pure or better. Such a product is a water-white liquid at room temperature with a density of about 0.992, a boiling point of about 141° C. and a melting point of —22° C.

In accordance with my invention, the zinc oxide is treated with propionic acid during vigorous agitation so as to bring the particles of the zinc oxide into intimate contact with the propionic acid. The propionic acid is preferably brought into contact with the zinc oxide either as a fine spray or mist, or vapor. The temperature of application should be such that the propionic acid has a substantial vapor pressure. The vapor pressure of propionic acid is sufficiently high that appreciable quantities of its vapor are present at temperatures ranging from room temperature to the boiling point of the propionic acid. However, the preferred temperature of application is approximately that of the boiling point of propionic acid, say, about 141° C. The zinc oxide preferably should be heated to a temperature of this order prior to bringing it into contact with the propionic acid. Such procedure assures the complete vaporization of the propionic acid at the point where it is to react with the zinc oxide, thus favoring prompt and uniform reaction of the two to form an adequate coating of zinc propionate.

The treatment of the zinc oxide with the propionic acid may be carried out in a variety of mixing apparatus. A suitable apparatus is a dry mixer or blender of customary type. Such a blender is a trough equipped with a stirring mechanism for agitating the zinc oxide and provided with means for heating the oxide, such as a jacket on the sides of the trough through which steam or other hot gases may be passed. The blender is preferably closed by a cover or other means to prevent the escape of the propionic acid and an inlet into the mixer chamber thus enclosed is provided for supplying propionic acid either as vapor or as a spray.

In the apparatus described above, the zinc oxide is preferably preheated prior to the introduction of the propionic acid in the form of vapor, mixed with air or with an inert gas, such as nitrogen, or in the form of a liquid spray. The stirring mechanism is operated during the preheating and while the propionic acid is introduced and for so long thereafter as is necessary to assure adequate mixing of the propionic acid and the zinc oxide. The duration of the treatment depends upon the temperature, the rate of agitation of the oxide, the quantity of oxide to be treated and the rate at which the propionic acid vapor or spray is furnished. In a laboratory mixer, the duration may vary from five to twenty minutes.

As indicated above, it is desirable to carry out the mixture of the propionic acid and the zinc oxide at a temperature near the boiling point of the propionic acid. However, propionic acid may be sprayed into the zinc oxide at room temperature, if such spraying is followed by long and vigorous mixing or disintegration of the resulting mixture to assure thorough distribution of the propionic acid on the oxide particles.

All portions of the apparatus that come in contact with the propionic acid and zinc oxide preferably should be of acid-resistant material, such as stainless steel, in order to prevent discoloration of the zinc oxide.

When the treatment is carried out as described above, or in any other way which assures adequate commixture of the propionic acid and the zinc oxide at reaction temperature, the greater part of the propionic acid reacts with the zinc oxide to form zinc propionate as a coating on the zinc oxide particles. That the reaction of the propionic acid and the zinc oxide is substantially complete is indicated by the fact that when the treatment is carried out as described above the strong odor of propionic acid is lost shortly after the incorporation of the acid in the zinc oxide, and, of course, mixing should be continued until this occurs. That the reaction of the zinc oxide and the propionic acid to form zinc propionate is substantially complete is also indicated by the fact that at least 75-80% of the propionic acid applied to the zinc oxide can be regenerated by treating the final product with sulfuric acid.

Some zinc oxide, particularly American process zinc oxide has a relatively high degree of acidity when fresh. This acidity is due primarily to retention for a time by the zinc oxide of acid compounds of sulfur derived from sulfur present in the charge from which the zinc oxide is prepared. In the American process, the sulfur originates from the coal used in the charge, and when the source of zinc is a roasted ore, also from residual sulfide sulfur in the ore. The amount of these adsorbed acid compounds present in the fresh oxide varies with the weather conditions prevailing at the time the oxide was produced. Ordinarily, on damp warm days zinc oxide of relatively low acidity, say, 0.2% is produced; on cold dry days, zinc oxide with relatively high acidity, for example, 0.6% is produced. The foregoing figures for zinc oxide acidity and others given hereinafter are calculated as per cent $SO_3$ on the weight of zinc oxide and are determined by titration with sodium hydroxide in a water slurry of the oxide with phenolphthalein as indicator.

I have discovered that an improved product for use in rubber compounding is obtained in the practice of my invention if the zinc oxide has an acidity below about 0.2%. The requisite reduction of acidity of the zinc oxide prior to treatment with propionic acid can be accomplished by mere aging at room temperature for about three months, the exact time required being dependent upon prevailing weather conditions, i. e., upon the temperature and degree of humidity to which the zinc oxide is subjected during aging. I have discovered, however, that in conjunction with and preferably prior to the treatment of the zinc oxide with the propionic acid it is desirable to subject the zinc oxide to an accelerated aging treatment with steam, such treatment being carried out until the zinc oxide has an acidity below about 0.2%. The treatment of the zinc oxide with steam is preferably conducted under such conditions that moisture is adsorbed or condensed on the zinc oxide, this moisture being removed by a drying treatment prior to contact of the zinc oxide with the propionic acid.

Thus, in the case of zinc oxide with an acidity exceeding about 0.2%, it is desirable to treat the zinc oxide with steam at about 90° to 110° C., this steam treatment being followed immediately by a heat treatment without steam. The heat treatment should be carried out at a temperature adequate to remove adsorbed moisture from the zinc oxide. For example, the heat treatment may raise the temperature of the zinc oxide to about 140° C. Apparently the acidity of the oxide is lowered by adsorption of moisture followed by the removal of that portion of the adsorbed moisture not consumed in transforming acidic constituents upon the surface of the zinc oxide into non-acidic constituents; therefore, the treatment should provide, first, conditions under which the zinc oxide may adsorb water, and then conditions under which the excess adsorbed moisture is expelled.

This preliminary treatment should be so carried out as to lower the acidity of the zinc oxide to below 0.2% before treatment with the propionic acid. The combined duration of the treatment may be only ten minutes in the case of oxide of relatively low acidity, say, 0.2%; in the case of oxide of relatively high acidity, say, 0.6%, forty minutes may be required. In normal practice, I find it satisfactory to treat with steam at 90-110° C., for twenty minutes, and then remove adsorbed moisture from the zinc oxide by heating to 140° C., in ten minutes. The oxide is then ready for immediate treatment with propionic acid. It will be understood that the times required may vary widely in actual practice, according to the size of the batch of zinc oxide under treatment, and the nature of the available equipment.

The zinc oxide should be vigorously stirred and agitated during the entire steam treatment and drying treatment. Thus, the treatment should be carried out in apparatus such as a dry blender equipped with a mixing device capable of running at a relatively rapid rate, say, 60 R. P. M. The apparatus should be provided with an inlet and outlet for steam, the inlet being equipped with a valve for shutting off the steam prior to the beginning of the drying treatment.

Immediately after the completion of the drying treatment, the zinc oxide is treated with propionic acid in the manner already described, the vigorous stirring and agitation of the zinc oxide being continued.

Zinc oxide that has been subjected to accelerated steam aging followed by the propionic acid treatment is particularly desirable. It is readily dispersed in rubber because of its coating of zinc propionate and does not delay the final cure of the rubber in case acidic accelerators are used. However, it should be observed in that that case that the propionic acid-treated zinc oxide brings about an advantageous delay in initial cure without delaying the time of optimum cure, a circumstance which makes it easier to avoid scorching the rubber.

As I have indicated above, the preferred practice is to carry out the accelerated aging of the zinc oxide by steam treatment followed by a drying treatment prior to the treatment with propionic acid, but it is also possible to carry on the steam treatment and the propionic acid treatment simultaneously, employing a propionic acid vapor or spray in an atmosphere of steam above its dew point. It is also possible to treat with propionic acid before the steam treatment. It will be understood, of course, that if the zinc oxide initially has a suitable low degree of acidity (i. e., below about 0.2%) due to aging treatment or other circumstances, the accelerated aging with steam may be omitted.

I claim:

1. In the treatment of finely-divided zinc oxide having an acidity in excess of 0.2%, the improvement which comprises exposing the zinc oxide to contact with steam until the acidity of the zinc oxide is substantially below 0.2% and to propionic acid in proportions ranging from about 0.1% to about 0.6% to form zinc propionate on the surfaces of the zinc oxide particles.

2. In the treatment of zinc oxide, the improvement which comprises treating finely-divided zinc oxide having an acidity less than about 0.2% calculated as per cent $SO_3$ on the weight of zinc oxide with from 0.1% to 0.6% on the weight of the zinc oxide of propionic acid to form zinc propionate on the particles of zinc oxide.

3. In the treatment of finely-divided zinc oxide, the improvement which comprises subjecting the zinc oxide to contact with steam until the acidity of the zinc oxide, calculated as per cent $SO_3$ on the weight of the oxide, is substantially less than 0.2% and thereafter drying the zinc oxide and reacting it with propionic acid to form zinc propionate on the particles thereof.

4. In the treatment of zinc oxide, the improvement which comprises heating the finely-divided zinc oxide to a temperature of 90–110° C. and bringing the zinc oxide thus treated into contact with steam at this temperature and maintaining the zinc oxide in contact with the steam until the acidity of the zinc oxide, calculated as per cent $SO_3$ on the weight of the oxide, is less than about 0.2% and thereafter reacting the zinc oxide with propionic acid in proportions ranging from about 0.1% to 0.6% on the weight of the zinc oxide to form zinc propionate.

5. Finely-divided zinc oxide having an acidity less than about 0.2% calculated as percent $SO_3$ on the weight of the zinc oxide, the particles of which are surface-coated with zinc propionate equivalent to about 0.1% to 0.6% of propionic acid on the weight of the zinc oxide.

6. Zinc oxide having an acidity less than about 0.2% calculated as percent $SO_3$ on the weight of the zinc oxide and having particles of average size ranging from 0.25 to 0.35 micron and coated with zinc propionate in proportions equivalent to about 0.4% to 0.6% of propionic acid on the weight of the zinc oxide.

7. In the treatment of zinc oxide, the improvement which comprises reacting finely divided zinc oxide having an acidity less than about 0.2%, calculated as percent $SO_3$ on the weight of the zinc oxide, with propionic acid under conditions such that the propionic acid has a substantial vapor pressure and thus forming zinc propionate on the particles of the zinc oxide.

HOWARD M. CYR.

CERTIFICATE OF CORRECTION.

Patent No. 2,303,329. December 1, 1942.

HOWARD M. CYR.

It is hereby certified that error appears in the printed specification of the above numbered patent requiring correction as follows: Page 1, first column, line 44, for "25 to 35" read --.25 to .35--; and that the said Letters Patent should be read with this correction therein that the same may conform to the record of the case in the Patent Office.

Signed and sealed this 2nd day of February, A. D. 1943.

(Seal)

Henry Van Arsdale,
Acting Commissioner of Patents.